US007012110B2

(12) United States Patent
Sherman et al.

(10) Patent No.: US 7,012,110 B2
(45) Date of Patent: Mar. 14, 2006

(54) SILICONE PRESSURE SENSITIVE ADHESIVES PREPARED USING PROCESSING AIDS, ARTICLES, AND METHODS

(75) Inventors: Audrey A. Sherman, St. Paul, MN (US); Kurt C. Melancon, White Bear Lake, MN (US); Anthony M. Kremer, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/028,553

(22) Filed: Dec. 18, 2001

(65) Prior Publication Data

US 2003/0175510 A1 Sep. 18, 2003

(51) Int. Cl.
C08K 5/54 (2006.01)

(52) U.S. Cl. .................. 524/267; 524/261; 525/478
(58) Field of Classification Search .................. 524/267, 524/261, 478; 525/478, 452; 428/447, 355 R, 428/355 CN, 448
See application file for complete search history.

(56) References Cited

U.S. PATENT DOCUMENTS

| | | | |
|---|---|---|---|
| 2,676,182 A | 4/1954 | Daudt et al. | |
| 2,736,721 A | 2/1956 | Dexter | |
| 3,627,851 A | 12/1971 | Brady | |
| 3,772,247 A | 11/1973 | Flannigan | |
| 3,890,269 A | 6/1975 | Martin | |
| 3,929,704 A | 12/1975 | Horning | |
| 4,309,520 A | 1/1982 | Blizzard | |
| 4,415,615 A | 11/1983 | Esmay et al. | |
| 4,584,355 A | 4/1986 | Blizzard et al. | |
| 4,661,577 A | 4/1987 | Jo Lane et al. | |
| 4,749,590 A | 6/1988 | Klingen et al. | |
| 4,882,377 A * | 11/1989 | Sweet et al. ................ | 524/267 |
| 4,900,474 A | 2/1990 | Terae et al. | |
| 4,935,484 A | 6/1990 | Wolfgruber et al. | |
| 5,001,012 A | 3/1991 | Sarkar et al. | |
| 5,024,880 A | 6/1991 | Veasley et al. | |
| 5,026,890 A | 6/1991 | Webb et al. | |
| 5,028,679 A | 7/1991 | Terae et al. | |
| 5,045,391 A | 9/1991 | Brandt et al. | |
| 5,082,706 A | 1/1992 | Tangney | |
| 5,110,882 A | 5/1992 | Hamada et al. | |
| 5,110,890 A | 5/1992 | Butler | |
| 5,118,775 A | 6/1992 | Inomata et al. | |
| 5,190,827 A | 3/1993 | Lin | |
| 5,214,119 A | 5/1993 | Leir et al. | |
| 5,236,997 A | 8/1993 | Fujiki | |
| 5,248,716 A | 9/1993 | Lin et al. | |
| 5,248,739 A | 9/1993 | Schmidt et al. | |
| 5,276,122 A | 1/1994 | Aoki et al. | |
| 5,290,615 A | 3/1994 | Tushaus et al. | |
| 5,302,685 A | 4/1994 | Tsumura et al. | |
| 5,319,040 A | 6/1994 | Wengrovius et al. | |
| 5,352,527 A | 10/1994 | Harada et al. | |
| 5,461,134 A | 10/1995 | Leir et al. | |
| 5,475,124 A | 12/1995 | Mazurek et al. | |
| 5,512,650 A | 4/1996 | Leir et al. | |
| 5,576,110 A | 11/1996 | Lin et al. | |
| 5,602,214 A | 2/1997 | Lin et al. | |
| 5,741,876 A | 4/1998 | Carpenter, II et al. | |
| 5,776,614 A * | 7/1998 | Cifuentes et al. ........... | 428/447 |
| 5,804,610 A | 9/1998 | Hamer et al. | |
| 5,916,981 A | 6/1999 | Cifuentes et al. | |
| 5,932,321 A | 8/1999 | Eisele et al. | |
| 6,007,914 A | 12/1999 | Joseph et al. | |
| 6,103,152 A | 8/2000 | Gehlsen et al. | |
| 6,107,222 A * | 8/2000 | Joseph et al. ................ | 442/412 |

FOREIGN PATENT DOCUMENTS

| | | |
|---|---|---|
| EP | 0 380 236 B1 | 8/1990 |
| EP | 0 867 493 A3 | 9/1998 |
| EP | 0 867 493 A2 | 9/1998 |
| JP | KOKAI 2-36234 | 2/1990 |
| JP | 2135210 | 5/1990 |
| JP | 2296832 | 12/1990 |
| WO | WO 96/30426 A1 | 10/1996 |
| WO | WO 96/34028 A1 | 10/1996 |
| WO | WO 96/34029 A1 | 10/1996 |
| WO | WO 96/34030 A1 | 10/1996 |
| WO | WO 96/35458 A3 | 11/1996 |
| WO | WO 96/35458 A2 | 11/1996 |
| WO | WO 97/40103 A1 | 10/1997 |
| WO | WO 98/15602 A1 | 4/1998 |
| WO | WO 98/17726 A1 | 4/1998 |

OTHER PUBLICATIONS

American Society for Testing and Materials, "ASTM D–3654–88, Standard Test Method for Holding Power of Pressure–Sensitive Tapes," *Annual Book of ASTM Standards*, pp. 545–548 (1988).
American Society for Testing and Materials, "ASTM D–3330–90, Standard Test Methods for Peel Adhesion of Pressure–Sensitive Tape at 180° Angle," *Annual Book of ASTM Standards*, pp. 485–488 (1990).
American Society for Testing and Materials, "ASTM D–2979–95, Standard Test Method for Pressure–Sensitive Tack of Adhesives Using an Inverted Probe Machine", *Annual Book of ASTM Standards*, pp. 183–185 (1995).
*Encyclopedia of Polymer Science and Engineering*, vol. 15, John Wiley & Sons, New York, 1989, pp. 265–270.
Tyagi et al., "Segmented organosiloxane copolymers: 2. Thermal and mechanical properties of siloxane–urea copolymers," *Polymer*, 25(12):1807–1816 (Dec., 1984).

* cited by examiner

*Primary Examiner*—Randy Gulakowski
*Assistant Examiner*—Christopher Keehan
(74) *Attorney, Agent, or Firm*—Lisa P. Fulton

(57) ABSTRACT

Pressure sensitive adhesives and methods, wherein the adhesives include a silicone tackifying resin and a polydiorganosiloxane polyurea copolymer. The tack of these adhesives is improved by the use of a processing aid, such as a plasticizer.

39 Claims, No Drawings

SILICONE PRESSURE SENSITIVE ADHESIVES PREPARED USING PROCESSING AIDS, ARTICLES, AND METHODS

FIELD OF THE INVENTION

The invention relates to silicone adhesives, articles, and methods of making. The adhesives are particularly useful on articles such as tapes, particularly foam tapes, for example.

BACKGROUND

Pressure sensitive adhesives containing polydiorganosiloxane polyurea copolymers and a compatible tackifier are well known. They have a variety of applications because they can possess one or more of the following properties: high thermal stability; high oxidative stability; permeability to many gases; low surface energy; low index of refraction; low hydrophilicity; dielectric properties; biocompatibility; and adhesive properties. Examples of such pressure sensitive adhesives are disclosed in U.S. Pat. No. 5,461,134 (Leir et al.), U.S. Pat. No. 5,512,650 (Leir et al.), U.S. Pat. No. 5,475,124 (Mazurek et al.), as well as International Publication Nos. WO 96/30426 (3M Co., St. Paul, Minn.), WO 96/34028 (3M Co.), WO 96/34029 (3M Co.), and WO 98/15602 (3M Co.).

Although silicone pressure sensitive adhesives are known to adhere to a wide variety of substrates, there is still a need for adhesives and adhesive articles, particularly tapes such as foam tapes, that provide an effective peel strength and shear strength to a wide variety of materials, as well as tack.

SUMMARY OF THE INVENTION

The present invention provides pressure sensitive adhesives (PSAs), adhesive articles, and methods. Preferably, the articles are in the form of tapes, such as foam tapes, for example.

Generally, the pressure sensitive adhesives of the present invention include a silicone tackifying resin and a polydiorganosiloxane polyurea copolymer. Typically, the silicone tackifying resin is present in the pressure sensitive adhesives in a relatively high amount, which reduces the tack at the interface between the adhesive and a release liner on which it is disposed (i.e., on the adhesive surface in contact with a release liner).

This relatively high amount (e.g., at least about 55 wt-%, based on the weight of the silicone tackifying resin and the polydiorganosiloxane polyurea copolymer) of silicone tackifying resin can result in a nonhomogeneous distribution of the components when applied from an organic solvent system and dried. Significantly, this nonhomogeneous distribution, which causes reduced tack at the adhesive/liner interface, can be overcome through the incorporation of a miscible processing aid, whether it be transient, permanent, or a combination thereof. Typically, if permanent, the processing aid is referred to herein as a plasticizer.

Thus, as a result of the use of a processing aid, the silicone tackifying resin and polydiorganosiloxane polyurea copolymer are generally uniformly distributed, in contrast to the same composition without the processing aid. This occurs during the preparation of the pressure sensitive adhesive coating as a result of the presence of the processing aid. A processing aid would not reverse any nonhomogeneous distribution if applied after such inhomogeneity occurs.

The adhesive of the present invention can form a discontinuous layer (e.g., pattern) on the substrate (e.g., backing of a tape) or it can form a continuous layer on at least one major surface thereof. It is a pressure sensitive adhesive, which unlike a heat activated adhesive, typically uses pressure to engage adhesion at room temperature (about 20° C. to about 30° C.) and does not require the use of a heating device.

In one embodiment, the present invention provides a pressure sensitive adhesive that includes: a silicone tackifying resin; a polydiorganosiloxane polyurea copolymer; and a plasticizer (i.e., a permanent processing aid); wherein the silicone tackifying resin and polydiorganosiloxane polyurea copolymer are generally uniformly distributed. Preferably, the silicone tackifying resin is present in an amount of at least about 55 wt-%, based on the weight of the silicone tackifying resin and the polydiorganosiloxane polyurea copolymer.

In another embodiment, the present invention provides a pressure sensitive adhesive that includes: a silicone tackifying resin; a polydiorganosiloxane polyurea copolymer; and a plasticizer; wherein the silicone tackifying resin and polydiorganosiloxane polyurea copolymer are generally uniformly distributed; and wherein the silicone tackifying resin is present in an amount of at least about 55 wt-%, based on the weight of the silicone tackifying resin and the polydiorganosiloxane polyurea copolymer.

In yet another embodiment, the present invention provides a pressure sensitive adhesive solution that includes: a silicone tackifying resin; a polydiorganosiloxane polyurea copolymer; a processing aid (which can be transient, permanent, or a combination thereof); and an organic solvent. Preferably, the processing aid is present in the solution in an amount of at least about 0.5 wt-%, based on the total weight of the pressure sensitive adhesive.

Methods of making such adhesives are also provided. In one embodiment, a method includes combining a silicone tackifying resin, a polydiorganosiloxane polyurea copolymer, and a processing aid in amounts effective to form a pressure sensitive adhesive wherein the silicone tackifying resin and polydiorganosiloxane polyurea copolymer are generally uniformly distributed.

In another embodiment, the present invention provides an adhesive article that includes a substrate having disposed on at least one major surface a silicone-based pressure sensitive adhesive, of the above formula. Adhesive articles include tapes, labels, and other sheeting useful in various formats including but not limited to medical, graphics, signage, damping, and analytical applications.

DETAILED DESCRIPTION OF PREFERRED EMBODIMENTS

The present invention provides silicone-based pressure sensitive adhesives, articles on which such adhesives are disposed (e.g., tapes, particularly transfer tapes), and methods of making and using such adhesives and articles. The pressure sensitive adhesives include at least one polydiorganosiloxane polyurea copolymer, at least one silicone tackifying resin, preferably in an amount of at least about 55 wt-%, based on the weight of the silicone tackifying resin and the polydiorganosiloxane polyurea copolymer, and at least one processing aid (preferably a plasticizer).

Such a high level of silicone tackifying resin is desirable to increase peel adhesion and to limit the level of adhesion build when the adhesive is aged on a fluorosilicone release liner. Significantly and advantageously, the silicone tackifying resin and the polydiorganosiloxane polyurea components are preferably generally uniformly distributed (i.e., at equal and constant concentrations at the adhesive surfaces and throughout the adhesive bulk). However, when tackifying resins of 55 wt-% (based on the silicone tackifying resin and the polydiorganosiloxane polyurea components) or greater are used in such an adhesive and the adhesive is coated and dried on an appropriate substrate, such as a release liner, a significant difference in tack occurs between the air interface and the liner interface of the adhesive. Specifically, the air interface typically exhibits significantly higher tack than the adhesive face in contact with the release liner. Such differential in tack may be minimized or eliminated by employing a miscible processing aid in the composition.

An adhesive article (e.g., tape) of the present invention includes a silicone-based pressure sensitive adhesive, disposed on a backing (i.e., substrate), which may be permanent or temporary, as with a release liner. One particularly preferred article is a tape, such as a transfer tape. Such transfer tapes may be used as prepared or used to make other preferred tape articles such as foam tapes.

As used herein, a pressure sensitive adhesive (PSA) possesses a balance of the following properties: (1) tack; (2) adherence with no more than finger pressure; (3) sufficient ability to hold onto an adherend; and (4) sufficient cohesive strength. Materials that have been found to function well as PSAs are polymers designed and formulated to exhibit the requisite viscoelastic properties resulting in a desired balance of tack, peel adhesion, and shear holding power.

An adhesive of the present invention preferably adheres well to a wide variety of materials, preferably, materials having high surface energies (e.g., above about 70 dynes/cm) and low surface energies (e.g., below about 50 dynes/cm), as well as those in between. Examples of such materials include polymethylmethacrylate (PMMA), polyethylene terephthalate (PET), polyurethane, polyamide (e.g, Nylon-6,6), polyvinylchloride (PVC), polyolefins, polystyrene, polycarbonate, polytetrafluoroethylene, iron, stainless steel, copper, aluminum, glass, painted surfaces, powder-coated surfaces, e.g., powder-coated paints, etc.

Surprisingly, the incorporation of a processing aid, whether it be transient, permanent, or a combination thereof, enhances the tack of a pressure sensitive adhesive containing a polydiorganosiloxane polyurea copolymer. This is significant because the properties of such adhesives are not easily modified with additives. That is, generally, polydiorganosiloxane polyurea copolymers are not readily compatible with many additives. Furthermore, it is significant that the incorporation of a processing aid, whether it be transient, permanent, or a combination thereof, does not adversely affect the performance of the pressure sensitive adhesives of the present invention. A processing aid would not reverse any nonhomogeneous distribution if applied after such inhomogeneity occurs.

Polydiorganosiloxane Polyurea Copolymers

Herein, copolymer refers to polymers containing two or more different monomers, including terpolymers, tetrapolymers, etc. Preferred polydiorganosiloxane polyurea copolymers suitable for use in the preparation of adhesives according to the present invention are the reaction products of at least one polyamine, wherein the polyamine includes at least one polydiorganosiloxane polyamine (preferably, diamine) with at least one polyisocyanate, and an optional polyfunctional chain extender such as an organic amine and/or alcohol. The mole ratio of isocyanate to amine is preferably in a range of about 0.9:1 to about 1.1:1, more preferably about 0.95:1 to about 1.05:1, and most preferably about 0.97:1 to about 1.03:1. That is, preferred polydiorganosiloxane polyurea copolymers suitable for use in the preparation of pressure sensitive adhesives according to the present invention have polydiorganosiloxane units, polyisocyanate residue units, and optionally, organic polyamine and/or polyol residue units. The polyisocyanate residue units and the polyamine residue units preferably form less than 15% by weight, and more preferably, less than 5% by weight, of the of the polydiorganosiloxane polyurea copolymer. The polyisocyanate residue is the polyisocyanate minus the —NCO groups and the polyamine residue is the polyamine minus the —NH$_2$ groups. The polyisocyanate residue is connected to the polyamine residue by urea linkages. The polyisocyanate residue is connected to the polyol residue by urethane linkages. Examples of such segmented copolymers are disclosed in U.S. Pat. No. 5,461,134 (Leir et al.) and International Publication Nos. WO 96/34029, WO 96/35458, and WO 98/17726, all to the 3M Co., St. Paul, Minn. As used herein, the term polydiorganosiloxane polyurea encompasses materials having the repeating unit of Formula I.

Preferably, the polydiorganosiloxane polyurea copolymers used in preparing the adhesive of the present invention can be represented by the repeating unit (Formula I):

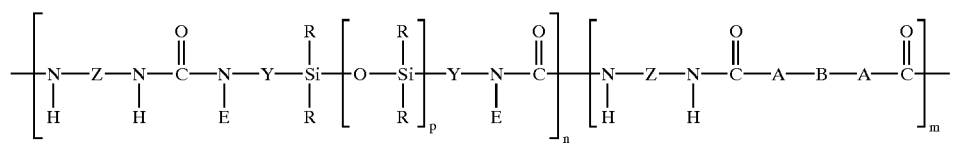

where:

each R is independently an alkyl moiety (preferably having 1 to 12 carbon atoms and may be substituted with, for example, trifluoroalkyl or vinyl groups), a vinyl moiety or higher alkenyl moiety (preferably represented by the formula —R$^2$(CH$_2$)$_a$CH=CH$_2$ wherein R$^2$ is —(CH$_2$)$_b$— or —(CH$_2$)$_c$CH=CH— and a is 1, 2, or 3, b is 0, 3, or 6, and c is 3, 4, or 5), a cycloalkyl moiety (preferably having 6 to 12 carbon atoms and may be substituted with, for example, alkyl, fluoroalkyl, or vinyl groups), or an aryl moiety (preferably having 6 to 20 carbon atoms and may be substituted with, for example, alkyl, cycloalkyl, fluoroalkyl or vinyl groups), or R is a fluorine-containing group (including those described in U.S. Pat. No. 5,236,997 (Fijiki), perfluoroalkyl groups as described in U.S. Pat. No. 5,028,679 (Terae et al.), or perfluoroether-containing groups, as described in U.S. Pat. No. 4,900,474 (Terae et al.) and U.S. Pat. No. 5,118,775 (Inomata et al.)); preferably at least 50% of the R moieties are methyl moieties with the balance being monovalent alkyl or substituted alkyl moieties having 1 to 12 carbon atoms, alkenylene moieties, phenyl moieties, or substituted phenyl moieties;

each Z is independently a polyvalent moiety that is an arylene moiety, an aralkylene moiety, an alkylene moiety, or a cycloalkylene moiety (each of which preferably has 6 to 20 carbon atoms); preferably Z is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 1,6-hexamethylene, 1,4-cyclohexylene, 2,2,4-trimethylhexylene, and mixtures thereof;

each Y is independently a polyvalent moiety that independently is an alkylene moiety (preferably having 1 to 10 carbon atoms), an aralkylene moiety or an arylene moiety (each of which preferably has 6 to 20 carbon atoms);

each E is independently hydrogen, an alkyl moiety of 1 to 10 carbon atoms, phenyl, or a moiety that completes a ring structure including Y to form a heterocycle;

each A is independently oxygen or —N(G)-, wherein each G is independently hydrogen, an alkyl moiety of 1 to 10 carbon atoms, phenyl, or a moiety that completes a ring structure including B to form a heterocycle;

B is an alkylene, aralkylene, cycloalkylene, phenylene, polyalkylene, polyalkylene oxide (including for example, polyethylene oxide, polypropylene oxide, polytetramethylene oxide, polycaprolactone, polyethylene adipate), copolymers, or mixtures thereof, or a moiety completing a ring structure including A to form a heterocycle;

m is a number that is 0 to about 1000, preferably 0 to about 25;

n is a number that is equal to or greater than 1 (preferably, n is greater than 8); and p is a number that is about 5 or larger, preferably, about 15 to about 2000, more preferably, about 70 to about 1500, and most preferably about 150 to about 1500.

In the use of polyisocyanates when Z is a moiety having a functionality greater than 2 and/or polyamines when B is a moiety having a functionality greater than 2, the structure of Formula I will be modified to reflect branching at the polymer backbone.

Reactive Components of the Polydiorganosiloxane Polyurea Copolymers

Different isocyanates in the reaction will modify the properties of the polydiorganosiloxane polyurea copolymers in varying ways. Diisocyanates useful in the process of the present invention can be represented by the following (Formula II):

OCN-Z-NCO

Any diisocyanate that can react with a polyamine, and in particular with polydiorganosiloxane diamine of Formula III, below, can be used in the present invention. Examples of such diisocyanates include, but are not limited to, aromatic diisocyanates, such as 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3',5,5'-tetraethyl) diphenylmethane, 4,4'-diisocyanato-3,3'-dimethoxybiphenyl (o-dianisidine diisocyanate), 5-chloro-2,4-toluene diisocyanate, 1-chloromethyl-2,4-diisocyanato benzene, aromatic-aliphatic diisocyanates such as m-xylylene diisocyanate, tetramethyl-m-xylylene diisocyanate, aliphatic diisocyanates, such as 1,4-diisocyanatobutane, 1,6-diisocyanatohexane, 1,12-diisocyanatododecane, 2-methyl-1,5-diisocyanatopentane, and cycloaliphatic diisocyanates such as methylenedicyclohexylene-4,4'-diisocyanate, 3-isocyanatomethyl-3,5,5-trimethylcyclohexyl isocyanate (isophorone diisocyanate), 2,2,4-trimethylhexyl diisocyanate, and cyclohexylene-1,4-diisocyanate and mixtures thereof.

Preferred diisocyanates include 2,6-toluene diisocyanate, methylenediphenylene-4,4'-diisocyanate, polycarbodiimide-modified methylenediphenyl diisocyanate, 4,4'-diisocyanato-3,3'-dimethoxybiphenyl(o-dianisidine diisocyanate), tetramethyl-m-xylylene diisocyanate, methylenedicyclohexylene-4,4'-diisocyanate, 3-isocyanatomethyl-3,5,5-trimethylcyclohexyl isocyanate (isophorone diisocyanate), 1,6-diisocyanatohexane, 2,2,4-trimethylhexyl diisocyanate, and cyclohexylene-1,4-diisocyanate.

Polydiorganosiloxane polyamines useful in the process of the present invention are preferably diamines, which can be represented by the following (Formula III):

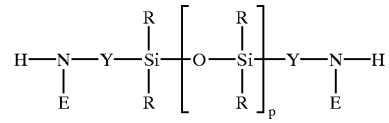

wherein each of R, Y, E, and p are defined as above. Generally, the number average molecular weight of the polydiorganosiloxane polyamines useful in the present invention is greater than about 700.

Preferred polydiorganosiloxane diamines (also referred to as silicone diamines) useful in the present invention are any which fall within Formula III above and including those having number average molecular weights in the range of about 5000 to about 150,000. Polydiorganosiloxane diamines are disclosed, for example, in U.S. Pat. No. 3,890,269 (Martin), U.S. Pat. No. 4,661,577 (JoLane et al.), U.S. Pat. No. 5,026,890 (Webb et al.), U.S. Pat. No. 5,214,119 (Leir et al.), U.S. Pat. No. 5,276,122 (Aoki et al.), U.S. Pat. Nos. 5,461,134 (Leir et al.), and U.S. Pat. No. 5,512,650 (Leir et al.).

Polydiorganosiloxane polyamines are commercially available from, for example, Shin-Etsu Silicones of America, Inc., Akron, Ohio, and Hüls America, Inc., Pitscataway, N.J. Preferred are substantially pure polydiorganosiloxane diamines prepared as disclosed in U.S. Pat. No. 5,214,119 (Leir et al.). The polydiorganosiloxane diamines having such high purity are prepared from the reaction of cyclic organosilanes and bis(aminoalkyl) disiloxanes utilizing an anhydrous amino alkyl functional silanolate catalyst such as tetramethylammonium-3-aminopropyldimethyl silanolate, preferably in an amount less than 0.15 weight percent based on the weight of the total amount of cyclic organosiloxane with the reaction run in two stages. Particularly preferred polydiorganosiloxane diamines are prepared using cesium and rubidium catalysts and are disclosed in U.S. Pat. No. 5,512,650 (Leir et al.).

Examples of polydiorganosiloxane polyamines useful in the present invention include, but are not limited to, polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, and copolymers and mixtures thereof.

The polydiorganosiloxane polyamine component employed to prepare polydiorganosiloxane polyurea segmented copolymers of this invention provides a means of adjusting the modulus of elasticity of the resultant copolymer. In general, high molecular weight polydiorganosiloxane polyamines provide copolymers of lower modulus, whereas low molecular weight polydiorganosiloxane polyamines provide polydiorganosiloxane polyurea segmented copolymers of higher modulus.

When polydiorganosiloxane polyurea segmented copolymer compositions contain an optional organic polyamine, this optional component provides yet another means of modifying the modulus of elasticity of copolymers of this invention. The concentration of organic polyamine as well as the type and molecular weight of the organic polyamine determine how it influences the modulus of polydiorganosiloxane polyurea segmented copolymers containing this component.

Examples of organic polyamines useful in the present invention include but are not limited to polyoxyalkylene diamine, such as D-230, D-400, D-2000, D-4000, DU-700, ED-2001 and EDR-148, all available from Huntsman Chemical Corp., Salt Lake City, Utah, polyoxyalkylene triamine, such as T-3000 and T-5000 available from Huntsman, polyalkylene diamines such as DYTEK A and DYTEK EP, available from DuPont, Wilmington, Del., 1,4-bis(3-aminopropyl)piperazine, (3,3'-diamino-N-methyldipropylamine) both available from Aldrich Chemical Co., Milwaukee, Wis., and mixtures thereof.

The nature of the isocyanate residue in the polydiorganosiloxane polyurea copolymer influences stiffness and flow properties, and also affects the properties of the mixtures. Isocyanate residues resulting from diisocyanates that form crystallizable ureas, such as tetramethyl-m-xylylene diisocyanate, 1,12-dodecane diisocyanate, and dianisidine diisocyanate, provide mixtures that can be stiffer, if sufficient polydiorganosiloxane polyurea copolymer is used, than those prepared from methylenedicyclohexylene-4,4'-diisocyanate, 3-isocyanatomethyl-3,5,5-trimethylcyclohexyl isocyanate, and m-xylylene diisocyanate.

Crosslinking agents, if desired may be used, for example Si—H-containing agents may be used to crosslink curable polydiorganosiloxane polyurea copolymers or photoinitiators can be used for free-radically curable polydiorganosiloxane urea copolymers. Additional curatives may also be present such as hydrosilation curatives, peroxide curatives, and photocuratives, such as triazines. When used, the amounts of such components are those that are suitable for the purpose intended and are typically used at a concentration of from about 0.1% to about 5% by weight of the total weight of the polymerizable composition. Crosslinking can also be carried out using electron beam radiation if desired.

Preparation of the Polydiorganosiloxane Polyurea Copolymers

The polydiorganosiloxane polyurea copolymers can be made by any of a variety of known methods, including solvent-based and solvent-free methods. Examples of solvent-based processes include Tyagi et al., "Segmented Organosiloxane Copolymers: 2. Thermal and Mechanical Properties of Siloxane urea Copolymers," *Polymer*, Vol. 25, December, 1984 and U.S. Pat. No. 5,214,119 (Leir et al.). Suitable solvents are organic solvents that are unreactive with the polyisocyanates and that maintain the reactants and products completely in solution throughout the polymerization reaction. Typical organic solvents include those that have a combination of polar and nonpolar character, or mixtures of polar solvents with nonpolar solvents can be used. Preferred organic solvents include polar aprotic solvents, chlorinated solvents, ethers, aromatic hydrocarbons, aliphatic hydrocarbons, and alcohols. Examples include heptane, toluene, xylene, methyl ethyl ketone, 2-propanol, tert-butanol, tetrahydrofuran, isoamyl alcohol, chloroform, dichloromethane, dimethyl formamide, and the like, and combinations thereof. Examples of solvent-free processes include International Publication Nos. WO 96/34029, WO 96/35458, and WO 98/17726, all to the 3M Co., St. Paul, Minn.

Silicone Tackifying Resins

Silicone tackifying resins are added to the polydiorganosiloxane polyurea copolymer to provide or enhance the pressure sensitive adhesive properties of the polymer. The silicone tackifying resin can play an important role in determining the physical properties of the polydiorganosiloxane polyurea copolymer of the present invention. For example, as silicone tackifying resin content is increased from low to high concentration, the glassy to rubbery transition of the polydiorganosiloxane polyurea copolymer occurs at increasingly higher temperatures. One need not be limited to a single silicone tackifying resin as it may be beneficial to employ a combination of resins in a single composition to achieve desired performance.

The silicone tackifying resins useful in the present invention include those resins composed of the following structural units M ($R'_3SiO_{1/2}$ units), D ($R'_2SiO_{2/2}$ units), T ($R'SiO_{3/2}$ units), and Q ($SiO_{4/2}$ units), and combinations thereof. Typical examples include MQ silicone tackifying resins, MQD silicone tackifying resins, and MQT silicone tackifying resins. These preferably have a number average molecular weight of about 100 to about 50,000, more preferably about 500 to about 15,000 and generally have methyl substituents.

MQ silicone tackifying resins are copolymeric silicone resins having $R'_3SiO_{1/2}$ units ("M" units) and $SiO_{4/2}$ units ("Q" units), where the M units are bonded to the Q units, each of which is bonded to at least one other Q unit. Some of the $SiO_{4/2}$ units ("Q" units) are bonded to hydroxyl radicals resulting in $HOSiO_{3/2}$ units ("$T^{OH}$" units), thereby accounting for the silicon-bonded hydroxyl content of the silicone tackifying resin, and some are bonded only to other $SiO_{4/2}$ units.

Such resins are described in, for example, *Encyclopedia of Polymer Science and Engineering*, vol. 15, John Wiley & Sons, New York, (1989), pp. 265–270, and U.S. Pat. No. 2,676,182 (Daudt et al.), U.S. Pat. No. 3,627,851 (Brady), U.S. Pat. No. 3,772,247 (Flannigan), and U.S. Pat. No. 5,248,739 (Schmidt et al.).

Other examples are disclosed in U.S. Pat. No. 5,082,706 (Tangney). The above-described resins are generally prepared in solvent. Dried or solventless, MQ silicone tackifying resins can be prepared, as described in U.S. Pat. No. 5,319,040 (Wengrovius et al.), U.S. Pat. No. 5,302,685 (Tsumura et al.), and U.S. Pat. No. 4,935,484 (Wolfgruber et al.).

Certain MQ silicone tackifying resins can be prepared by the silica hydrosol capping process described in U.S. Pat. No. 2,676,182 (Daudt et al.) as modified according to U.S. Pat. No. 3,627,851 (Brady), and U.S. Pat. No. 3,772,247 (Flannigan). The modified process of Daudt et al. includes limiting the concentration of the sodium silicate solution, and/or the silicon-to-sodium ratio in the sodium silicate, and/or the time before capping the neutralized sodium silicate solution to generally lower values than those disclosed by Daudt et al. The neutralized silica hydrosol is preferably stabilized with an alcohol, such as 2-propanol, and capped with $R_3SiO_{1/2}$ siloxane units as soon as possible after being neutralized. It is important to note that the level of silicon bonded hydroxyl groups on the MQ resin may be reduced, preferably to less than about 1.5% by weight, more preferably to no greater than about 1.2 wt-%, even more preferably to no greater than about 1.0 wt-%, and most preferably to no greater than 0.8 wt-%. This may be accomplished, for example, by reacting hexamethyldisilazane with the silicone tackifying resin. Such a reaction may be catalyzed, for example, with trifluoroacetic acid.

Alternatively, trimethylchlorosilane or trimethylsilylacetamide may be reacted with the silicone tackifying resin, a catalyst not being necessary in this case.

MQD silicone tackifying resins are terpolymers having $R'_3SiO_{1/2}$ units ("M" units), $SiO_{4/2}$ units ("Q" units), and $R'_2SiO_{2/2}$ units ("D" units) such as are taught in U.S. Pat. No. 2,736,721 (Dexter). In MQD silicone tackifying resins, some of the methyl groups of the $R'_2SiO_{2/2}$ units ("D" units) can be replaced with vinyl ($CH_2$=CH—) groups ("$D^{Vi}$" units).

MQT silicone tackifying resins are terpolymers having $R'_3SiO_{1/2}$ units, $SiO_{4/2}$ units and $R'SiO_{3/2}$ units ("T" units) such as are taught in U.S. Pat. No. 5,110,890 (Butler), and Japanese Kokai HE 2-36234.

Suitable silicone tackifying resins are commercially available from sources such as Dow Corning, Midland, Mich., General Electric Silicones Waterford, N.Y. and Rhodia Silicones, Rock Hill, S.C. Examples of particularly useful MQ silicone tackifying resins include those available under the trade designations SR-545 and SR-1000, both of which are commercially available from GE Silicones, Waterford, N.Y. Such resins are generally supplied in organic solvent and may be employed in the adhesives of the present invention as received. Also useful in polydiorganosiloxane polyurea copolymers of the present invention are blends of two or more silicone resins.

The amount of a tackifying resin (includes MQ resin, MQT, and MQD) needed will determine the desired levels of release and peel forces of the PSA compositions. Preferably, at least about 55 weight parts, and more preferably, at least about 58 weight parts tackifying resin, is used to achieve the desired balance of release force, peel, and shear performance, when the total weight parts (i.e., parts by weight) of tackifying resin plus polydiorganosiloxane polyurea copolymers equals 100 parts (thus, these weight parts are in percentages). Preferably, no greater than about 70 weight parts, and more preferably, no greater than about 65 weight parts tackifying resin, is used to achieve the desired balance of release force, peel, and shear performance, when the total weight parts (i.e., parts by weight) of tackifying resin plus polydiorganosiloxane polyurea copolymers equals 100 parts (thus, these weight parts are in percentages based on the weight of the silicone tackifying resin and the polydiorganosiloxane polyurea copolymer).

Useful silicone tackifying resins include a relatively high M/Q ratio and low silanol content resins. Preferably, the silicone tackifying resins contain less than about 1.5% by weight silanol (Si—OH) content (i.e., hydroxyl content as silanol), based on the total weight of the silicone tackifying resin.

Processing Aids

Processing aids, such as plasticizers, are beneficially added to solvent-based adhesive compositions (i.e., those coated out of an organic solvent) of the present invention to ensure generally uniform distribution of the polydiorganosiloxane polyurea copolymer and the silicone tackifying resin throughout the thickness of the adhesive layer. As described previously, high concentrations of silicone tackifying resin are advantageously employed to increase peel adhesion and to limit the level of adhesion build when the adhesive is disposed and aged on a fluorosilicone release liner. However, when tackifying resin concentrations of 55 wt-% (based on the silicone tackifying resin and the polydiorganosiloxane polyurea components) or greater are used in such an adhesive and the adhesive is applied from solvent to an appropriate substrate, such as a release liner, a significant difference in tack occurs between the air interface and the liner interface of the adhesive. Specifically, the air interface typically exhibits significantly higher tack than the adhesive face in contact with the release liner. This loss in tack on the liner side of the adhesive is believed due to a concentration gradient in silicone tackifying resin that occurs upon drying the adhesive, where the adhesive air interface is depleted in tackifying resin and liner side of the adhesive is enriched in tackifying resin. The increase in silicone tackifying resin concentration on the liner side of the PSA and consequent loss in tack may be minimized or eliminated by employing a miscible processing aid, such as a plasticizer, in the adhesive composition. Although shear holding power may be reduced with the use of such processing aids, surprisingly, they provide a good balance of tack, peel, and shear holding power.

Suitable processing aids, which may be transient, permanent, or a combination thereof, are those that are generally miscible (i.e., form generally clear mixture) with the components of the pressure sensitive adhesive, particularly the silicone tackifying resin and the polydiorganosiloxane, and do not adversely effect the performance of the adhesive. Typically, such processing aids include hydrocarbons, which may or may not have functional groups, heteroatoms, etc., glycol ethers, esters, alcohols, ester alcohols, ketones, amines, and organic substituted silicone oils. Examples include alkanes, alkenes, acrylates, esters, oils (e.g., aromatic oils, mineral oils, naphthenic oils), and organosiloxanes. Various combinations of such processing aids can be used if desired. Particularly preferred examples of such processing aids are listed in the Examples Section.

One of ordinary skill in the art can easily determine if a particular molecule, oligomer, or oil is a suitable processing aid for silicone polyurea-based adhesives by performing the following test. To a solvent-based silicone polyurea adhesive composition containing 40 parts silicone polyurea elastomer solids and 60 parts MQ resin SR545 solids, add 1.5 parts processing aid per 100 parts adhesive solids, coat the adhesive onto a fluorosilicone release liner, dry at 70° C. for 10 minutes, laminate this to a film backing to form a tape, remove the release liner, and compare the tack of the exposed adhesive to the parent adhesive composition, processed by the same means, by the Probe Tack Test described in the Examples section. Processing aids suitable for use in the instant invention provide an improvement in tack of at least 10% over that of the parent adhesive composition that was prepared without a processing aid.

The processing aids can be either transient (i.e., volatile) or permanent. Certain alkanes are transient, whereas certain alkenes, acrylates, esters, oils (e.g., aromatic oils, mineral oils, naphthenic oils), and organosiloxanes are permanent. The term transient indicates that substantially none of the processing aid remains in the adhesive composition after coating out of a solvent and removal of the solvent. The term permanent indicates that some or all of the processing aid remains in the adhesive composition after coating out of a solvent and removal of the solvent. Such permanent processing aids are referred to herein as plasticizers.

Besides the classes of processing aids described above, materials used to fulfill a different function in the formulation can also serve as processing aids, and typically plasticizers. Examples of these include such things as antioxidants, bacteriostatic agents, UV light stabilizers and absorbers, such as hindered amine light stabilizers (HALS). Preferred examples of such plasticizers include TINUVIN 328, TINUVIN 292, TINUVIN 765, TINUVIN 123, CGL-139, and IRGANOX 1076 commercially available from Ciba Specialty Chemicals, and CYASORB UV-3581 and CYASORB UV-531 commercially available from Cytec Industries, Inc.

One or more processing aids (preferably permanent processing aids, i.e., plasticizers) can be used in a pressure sensitive adhesive of the present invention. Preferably, the total amount of processing aid is initially present in an amount of at least about 0.5 wt-%, and more preferably, at least about 1 wt-%, based on the total weight of the pressure sensitive adhesive composition. Preferably, the total amount of processing aid is initially present in an amount of no greater than about 10 wt-%, more preferably, no greater than about 6 wt-%, and most preferably, no greater than about 5 wt-%, based on the total weight of the composition.

Other Optional Additives

The pressure sensitive adhesives of the present invention can include other additives to provide desired properties. For example, dyes or pigments may be added as colorant; electrically and/or thermally conductive compounds may be added to make an adhesive electrically and/or thermally conductive or antistatic; antioxidants and bacteriostatic agents may be added; and UV light stabilizers and absorbers, such as hindered amine light stabilizers (HALS), may be added to stabilize the PSA against UV degradation and to block certain UV wavelengths from passing through the article. Other additives include adhesion promoters, fillers, tack enhancers, glass or ceramic microbubbles, expanded and unexpanded polymeric microspheres, blowing agents, polymers, and other property modifiers, such as clays, flame retardants, and compatibilizers. These additives can be used in various combinations in amounts of about 0.05 weight percent to about 25 weight percent, based on the total weight of the polydiorganosiloxane polyurea adhesive composition.

Preparation and Use of Adhesive Articles

The adhesive composition can be applied to appropriate release liners or tape backings by a wide range of processes, including, solution coating, solution spraying, hot melt coating, extrusion, coextrusion, lamination, pattern coating, etc., to make adhesive laminates. Typically, it is applied to a substrate, such as polyethylene terephthalate coated with a fluorosilicone release material (such as that disclosed in U.S. Pat. No. 5,082,706 (Tangney) and commercially available from Loparex, Inc., Bedford Park, Ill.) to form an adhesive/release liner laminate. The liner can have a microstructure on its surface that is imparted to the adhesive to form a microstructure on the adhesive surface. The adhesive transfer tape can be used as is or can be applied, e.g., laminated, to at least one side of a desired substrate, such as biaxially oriented polyethylene or high density polyethylene, to form an adhesive tape. When laminated onto only one side of a substrate, e.g., a backing film or a foam substrate, a single sided tape can be produced. When laminated onto both sides of a substrate, e.g., a film or a foam, a double-sided tape can be produced. Additionally, in the case of a double-sided tape, the tape can have chemically or theologically the same or different adhesive on its sides, e.g., one adhesive may be a pressure sensitive adhesive, the other, a heat activated adhesive, or one adhesive is silicone based and the other is acrylic based.

Suitable backings for use in the adhesive articles of the present invention can include a wide range of substrate materials, examples being polymer films such as polyimide, polyethylene, polyethylene terephthalate (PET), biaxially oriented polypropylene (BOPP), and metallocene-polymerized poly(alpha-olefin) copolymers, foams, cloth, paper, treated paper, woven and nonwoven scrims, netting, mesh, and the like.

The adhesive articles of the invention are tapes or sheets that may contain additional layers such as primers, barrier coatings, metal and/or reflective layers, tie layers, and combinations thereof. Priming of the layer(s) may include a priming step such as chemical or mechanical priming. An example of a useful chemical primer is a solvent solution of acrylonitrile butadiene rubber, epoxy resin, and polyamide resin. Other suitable chemical primers are described in U.S. patent application Ser. No. 10/025,130 filed on Dec. 18, 2001.

The adhesive articles of the invention may be exposed to post processing steps such as die cutting, heating to cause expansion of the article, e.g., foam-in-place, and the like.

Objects and advantages of this invention are further illustrated by the following examples, but the particular materials and amounts thereof recited in these examples, as well as other conditions and details, should not be construed to unduly limit this invention. All amounts listed in the tape preparations and examples are by weight unless otherwise specified.

EXAMPLES

These examples are merely for illustrative purposes only and are not meant to be limiting on the scope of the appended claims. All parts, percentages, ratios, etc. in the examples and the rest of the specification are by weight unless indicated otherwise.

Table of Abbreviations

| Trade Designation or Other Abbreviation | Description |
|---|---|
| DYTEK A | 2-Methyl-1,5-diaminopentane commercially available from DuPont, Wilmington, DE |
| Meta-TMXDI (also referred to as "m-TMXDI") | Benzene, 1,3-Bis(1-isocyanato-1-methylethyl)-commercially available from Cytec Industries Inc, West Paterson, NJ |
| DESMODUR W H12MDI (also referred to as "H-MDI") | Methylenedicyclohexylene-4,4'-diisocyanate commercially available from Bayer, Pittsburgh, PA |
| PET | An aminated-polybutadiene primed film of polyethylene terephthalate having a thickness of 38 micrometers |
| PDMS diamine 33,000 | An approximately 33,000 molecular weight polydimethylsiloxane diamine prepared as described in Example 2 of U.S. Pat. No. 5,461,134 |
| PDMS diamine 22,000 | An approximately 22,000 molecular weight polydimethylsiloxane diamine prepared as described in Example 2 of U.S. Pat. No. 5,461,134 |
| PDMS diamine 65,000 | An approximately 65,000 molecular weight polydimethylsiloxane diamine prepared as described in Example 2 of U.S. Pat. No. 5,461,134 |
| PDMS diamine 10,000 | An approximately 10,000 molecular weight polydimethylsiloxane diamine prepared as described in Example 2 of U.S. Pat. No. 5,461,134 |
| PDMS diamine 6,400 | An approximately 6,400 molecular weight polydimethylsiloxane diamine prepared as described in Example 2 of U.S. Pat. No. 5,461,134 |
| SR-545 | A 60% solids solution of MQ resin in toluene commercially available from GE Silicones, Waterford, NY under the trade designation SR-545 |
| SR-1000 | An MQ resin (100% solids) commercially available from GE Silicones, Waterford, NY under the trade designation SR-1000 |

-continued

Table of Abbreviations

| Trade Designation or Other Abbreviation | Description |
|---|---|
| MQ Resin 1 | MQ silicone resin consisting of M, Q, and $T^{OH}$ structural units, having an M/Q ratio of 1.2, SiOH content of 0.7%, Mn = 2730, and Mw = 4410, 62.4% solids by weight in xylene referred to as "MQ Resin F" in U.S. patent application Ser. No. 10/027,587, filed on Dec. 18, 2001, and characterized according to the methods described therein |
| Mineral Oil | Heavy Mineral Oil, laxative grade, commercially available from MediKay Laboratories in Brookfield, MO |
| PLASTHALL DIODD | Diisooctyl dodecanedioate commercially available from C. P. Hall Co., Chicago, IL |
| BENZOFLEX 9-88 | Dipropylene Glycol Dibenzoate commercially available from Velsicol Chemical Corporation, Rosemont, IL |
| Santicizer 141 | 2-Ethylhexyl diphenylphosphate commercially available from Solutia, Laguna Hills, CA |
| Kaydol Oil | USP mineral oil commercially available from C K Witco Corporation, Petrolia, PA |
| Ageflex FA12 | Lauryl acrylate commercially available from C P S Chemicals, Old Bridge, NJ |
| Santicizer (97) | Bis(2-ethyl hexyl) adipate commercially available from Solutia, Laguna Hills, CA |
| IPM | Isopropyl myristate commercially available from Aldrich Chemical, Milwaukee, WI |
| Decane | n-Alkane commercially available from Aldrich Chemical; Milwaukee, WI |
| Dodecane | n-Alkane commercially available from Aldrich Chemical; Milwaukee, WI |
| Tetradecane | n-Alkane commercially available from Aldrich Chemical; Milwaukee, WI |
| Hexadecane | n-Alkane commercially available from Aldrich Chemical; Milwaukee, WI |
| EXXSOL D80 | Dearomatized aliphatic solvent commercially available from Exxon Co., Houston, TX |
| EXXSOL D110 | Dearomatized aliphatic solvent commercially available from Exxon Co, Houston, TX |
| EXXSOL D130 | Dearomatized aliphatic solvent commercially available from Exxon Co., Houston, TX |
| Octadecene | 1-Alkene available from Aldrich Chemical, Milwaukee, WI |
| Tributyrin | Triester of glycerin and butyric acid commercially available from Aldrich Chemical, Milwaukee, WI |
| Tricaprylin | Triester of glycerin and octanoic acid commercially available from Fluka Chemika, Buchs, Switzerland |
| CITROFLEX A-4 | Acetyl tributyl citrate commercially available from Morflex Inc., Greensboro, NC |
| CITROFLEX B-6 | Butyryl trihexyl citrate commercially available from Morflex Inc., Greensboro, NC |
| TELLURA 315A | Naphthenic process oil available from Exxon Co., Houston, TX |
| TELLURA 415A | Extracted naphthenic process oil available from Exxon Co., Houston, TX |
| BRITOL | USP mineral oil available from CK Witco Corp., Petrolia, PA |
| DC 200 | Trimethylsilyl terminated polydimethylsiloxane fluid having a viscosity of 10 centistokes commercially available from Dow Corning, Midland, MI |
| Silicate Cluster 102 | Tris(tri-sec-butoxysiloxy)methylsilane commercially available from Olin Chemicals, Stamford, CT |
| D10HEX | See Organic Substituted Siloxanes section below |
| D10DEC | See Organic Substituted Siloxanes section below |
| D30HEX | See Organic Substituted Siloxanes section below |
| D2DEC | See Organic Substituted Siloxanes section below |
| D2TET | See Organic Substituted Siloxanes section below |
| TINUVIN 328 | UV absorber commercially available from Ciba Specialty Chemicals, Tarrytown, NY |
| TINUVIN 292 | Hindered amine light stabilizer commercially available from Ciba Specialty Chemicals, Tarrytown, NY |
| IRGANOX 1076 | Antioxidant commercially available from Ciba Specialty Chemicals, Tarrytown, NY |

Organic Substituted Siloxanes

Several organic substituted siloxane polymers were prepared by reacting 1-alkenes, via hydrosilation, with silicone hydride functional siloxanes. The silicon hydride functional siloxanes employed consisted of trimethylsilyl (M) terminated silicone copolymers composed of dimethylsiloxane (D) and methylhydrogensiloxane ($D^H$) structural units, and tetramethyldisiloxane (TMDS). The general preparation procedure consisted of weighing into a vial a 50 mol % excess of 1-alkene, relative to silicon hydride present in the siloxane, and adding to it 50 ppm Pt as a complex with divinyltetramethyldisiloxane. The vial was placed in an ice bath and the silicone hydride functional siloxane was added in a dropwise fashion to maintain temperature at 40–50° C. Reaction completion was verified by observing the disappearance of the silicon hydride band by IR spectroscopy. Excess 1-alkene was removed from the resulting organic substituted siloxane by devolatilizing at 70° C. under a pressure of 0.2 mm Hg for 24 hours. The amounts shown in Table A were employed to prepare the following materials.

TABLE A

| Processing Aid | Siloxane | 1-alkene |
|---|---|---|
| D10HEX | 10.19 parts $MD_{5.8}D^H_{5.0}M$ | 7.21 parts 1-hexene |
| D10DEC | 8.40 parts $MD_{5.8}D^H_{5.0}M$ | 9.90 parts 1-decene |
| D30HEX | 9.49 parts $MD_{15}D^H_{15}M$ | 8.26 parts 1-hexene |
| D2DEC | 9.95 parts TMDS | 33.66 parts 1-decene |
| D2TET | 7.46 parts TMDS | 35.35 parts 1-tetradecene |

Test Methods

180° Peel Adhesion

This peel adhesion test is similar to the test method described in ASTM D 3330-90, substituting a glass substrate or a high density polyethylene (HDPE) substrate for the stainless steel substrate described in the test. When the HDPE substrate was used the test data are labeled "180° peel from HDPE".

Adhesive coatings on PET film were cut into 1.27 centimeter by 20 centimeter strips. Each strip was then adhered to a 10 centimeter by 20 centimeter clean, solvent washed glass coupon or HDPE panel using a 2-kilogram roller passed once over the strip. The bonded assembly dwelled at room temperature for about one minute and was tested for 180° peel adhesion using an IMASS slip/peel tester (Model 3M90, commercially available from Instrumentors Inc., Strongsville, Ohio) at a rate of 2.3 meters/minute (90 inches/minute) over a two second data collection time. Two samples were tested; the reported peel adhesion value is an average of the peel adhesion value from each of the two samples (three samples for HDPE).

Room and Elevated Temperature Shear Strength

This shear strength test is similar to the test method described in ASTM D 3654-88.

Adhesive coatings on PET film were cut into 1.27 centimeter (0.5 inch) by 15 centimeter (6 inch) strips. Each strip was then adhered to a stainless steel panel such that a 1.27 centimeter by 1.27 centimeter portion of each strip was in firm contact with the panel and one end portion of the tape being free. The panel with coated strip attached was held in a rack such that the panel formed an angle of 178° with the extended tape free end which was tensioned by application of a force of one kilogram applied as a hanging weight from the free end of the coated strip. The 2° less than 180° was used to negate any peel forces, thus ensuring that only shear strength forces were measured, in an attempt to more accurately determine the holding power of the tape being tested. The time elapsed for each tape example to separate from the test panel was recorded as the shear strength. All shear strength failures (if the adhesive failed at less than 10,000 minutes) reported herein were cohesive failures of the adhesive. Each test was terminated at 10,000 minutes, unless the adhesive failed at an earlier time (as noted). For elevated temperature shear strength testing (70° C.) the panel with coated strip attached was placed in a 70° C. oven for 10 minutes with no load before the 1 kilogram hanging weight was attached.

Finger Tack Test

The tack of the coated adhesive layer was estimated by touching the adhesive with a finger and ranking the tack on a 0–3 scale, 0=no tack, 3=extremely tacky.

Probe Tack Test

Probe tack tests were performed on a POLYKEN Probe Tack Tester manufactured by Testing Machines Inc., Amityville L.I., N.Y. The tack test was conducted as described in ASTM test method D 2979-95 by applying the PSA tape to a 20 gram annular ring, and allowing the 5 millimeter diameter stainless steel probe to contact the exposed PSA tape for 1 second before it was removed at a rate of 1 cm/sec. Five samples of each tape were tested; the reported tack value, in grams, is an average of the tack value from each of the five samples. The tack probe was cleaned with a cotton tipped swab saturated with methyl ethyl ketone between each test.

Examples 1–15 and Comparative Example C1

In a reaction vessel was placed 11.77 parts of PDMS diamine 33,000 and 30.00 parts of a 60% solution in toluene of SR-545 and 0.04 part of DYTEK A. Toluene (37.00 parts) and 2-propanol (21.00 parts) were added to make the solids content 30%. The solution was stirred at room temperature, 0.19 part of H-MDI was added and the resulting mixture was stirred for two hours to give a PSA solution with a weight ratio of elastomer to SR-545 (tackifier resin) of 40:60. A processing aid was added to this solution in the amounts shown in Table 1. The resulting solution was solvent coated onto a release liner and dried for 10 minutes at 70° C. The resulting PSA coating was laminated onto a PET film to form a tape. These tapes were tested for 180° peel force, elevated temperature shear strength and finger tack. These data are presented in Table 1.

TABLE 1

| Ex. | Processing Aid Identity | Processing Aid Level (Weight %) | 180° Peel (N/dm) | 70° C. Shear (mins) | Finger Tack |
|---|---|---|---|---|---|
| 1 | Mineral Oil | 1 | 57.1 | 10,000 | 1 |
| 2 | Mineral Oil | 2 | 70.9 | 10,000 | 2 |
| 3 | PLASTHALL DIODD | 2 | 51.9 | 3,860 | 2 |
| 4 | PLASTHALL DIODD | 4 | 51.4 | 2,300 | 3 |
| 5 | BENZOFLEX 9-88 | 1 | 77.9 | 10,000 | 1 |
| 6 | BENZOFLEX 9-88 | 2 | 50.5 | 10,000 | 2 |
| 7 | BENZOFLEX 9-88 | 3 | NR* | 5,140 | 3 |
| 8 | Kaydol Oil | 1 | 60.8 | 10,000 | 1 |
| 9 | Kaydol Oil | 3 | 61.8 | 4,130 | 2 |
| 10 | Ageflex FA12 | 3 | 57.8 | 10,000 | 1 |
| 11 | Ageflex FA12 | 5 | 62.4 | 2,180 | 2 |
| 12 | Santicizer (97) | 3 | 62.8 | 5,320 | 1 |
| 13 | Santicizer (97) | 5 | 57.1 | 2,390 | 2 |
| 14 | IPM | 3 | 76.6 | 10,000 | 2 |
| 15 | IPM | 5 | 72.2 | 10,000 | 3 |
| C1 | None | 0 | 61.7 | 10,000 | 0 |

*Test was not run on this sample.

Examples 16–19 and Comparative Example C2

In a reaction vessel was placed 13.23 parts of PDMS diamine 22,000 and 27.50 parts of a 60% solution in toluene of SR-545 and 0.03 part of DYTEK A. Toluene (38.00 parts) and 2-propanol (21.00 parts) were added to make the solids content 30%. The solution was stirred at room temperature, 0.24 part of H-MDI was added and the resulting mixture was stirred for two hours to give a PSA solution with a weight ratio of elastomer to SR-545 (tackifier resin) of 45:55. A processing aid was added to this solution in the amounts shown in Table 2. The resulting solution was solvent coated onto a release liner and dried for 10 minutes at 70° C. The resulting PSA coating was laminated onto a PET film to form a tape. These tapes were tested for 180° peel force, room temperature shear strength and finger tack. These data are presented in Table 2.

TABLE 2

| Ex. | Processing Aid Identity | Processing Aid Level (Weight %) | 180° Peel (N/dm) | RT Shear (mins) | Finger Tack |
|---|---|---|---|---|---|
| 16 | Mineral Oil | 1 | 58.6 | 10,000 | 2 |
| 17 | Mineral Oil | 3 | 49.2 | 10,000 | 3 |
| 18 | IPM | 3 | 54.5 | 10,000 | 2 |
| 19 | IPM | 5 | 43.1 | 10,000 | 3 |
| C2 | None | 0 | 62.6 | 10,000 | 1 |

Examples 20–23 and Comparative Example C3

In a reaction vessel was placed 11.76 parts of PDMS diamine 22,000 and 30.00 parts of a 60% solution in toluene of SR-545 and 0.03 part of DYTEK A. Toluene (37.00 parts) and 2-propanol (21.00 parts) were added to make the solids content 30%. The solution was stirred at room temperature, 0.21 part of H-MDI was added and the resulting mixture was stirred for two hours to give a PSA solution with a weight ratio of elastomer to SR-545 (tackifier resin) of 40:60. A processing aid was added to this solution in the amounts shown in Table 3. The resulting solution was solvent coated onto a release liner and dried for 10 minutes at 70° C. The resulting PSA coating was laminated onto a PET film to form a tape. These tapes were tested for 180° peel force, room temperature shear strength and finger tack. These data are presented in Table 3.

TABLE 3

| Ex. | Processing Aid Identity | Processing Aid Level (Weight %) | 180° Peel (N/dm) | RT Shear (mins) | Finger Tack |
|---|---|---|---|---|---|
| 20 | Mineral Oil | 1 | 61.7 | 10,000 | 1 |
| 21 | Mineral Oil | 3 | 53.4 | 10,000 | 2 |
| 22 | IPM | 3 | 49.0 | 10,000 | 2 |
| 23 | IPM | 5 | 47.3 | 10,000 | 3 |
| C3 | None | 0 | 60.2 | 10,000 | 0 |

Examples 24–27 and Comparative Example C4

In a reaction vessel was placed 13.33 parts of PDMS diamine 65,000 and 27.50 parts of a 60% solution in toluene of SR-545 and 0.04 part of DYTEK A. Toluene (38.00 parts) and 2-propanol (21.00 parts) were added to make the solids content 30%. The solution was stirred at room temperature, 0.13 part of H-MDI was added and the resulting mixture was stirred for two hours to give a PSA solution with a weight ratio of elastomer to SR-545 (tackifier resin) of 45:55. A processing aid was added to this solution in the amounts shown in Table 4. The resulting solution was solvent coated onto a release liner and dried for 10 minutes at 70° C. The resulting PSA coating was laminated onto a PET film to form a tape. These tapes were tested for 180° peel force, room temperature shear strength and finger tack. These data are presented in Table 4.

TABLE 4

| Ex. | Processing Aid Identity | Processing Aid Level (Weight %) | 180° Peel (N/dm) | RT Shear (mins) | Finger Tack |
|---|---|---|---|---|---|
| 24 | Mineral Oil | 1 | 52.7 | 9,000 | 2 |
| 25 | Mineral Oil | 3 | 65.9 | 1,500 | 3 |
| 26 | IPM | 3 | 75.9 | 2,000 | 2 |
| 27 | IPM | 5 | 74.6 | 1,200 | 3 |
| C4 | None | 0 | 68.0 | 10,000 | 1 |

Examples 28–31 and Comparative Example C5

In a reaction vessel was placed 11.85 parts of PDMS diamine 22,000 and 30.00 parts of a 60% solution in toluene of SR-545 and 0.03 part of DYTEK A. Toluene (37.00 parts) and 2-propanol (21.00 parts) were added to make the solids content 30%. The solution was stirred at room temperature, 0.12 part of H-MDI was added and the resulting mixture was stirred for two hours to give a PSA solution with a weight ratio of elastomer to SR-545 (tackifier resin) of 40:60. A processing aid was added to this solution in the amounts shown in Table 5. The resulting solution was solvent coated onto a release liner and dried for 10 minutes at 70° C. The resulting PSA coating was laminated onto a PET film to form a tape. These tapes were tested for 180° peel force, room temperature shear strength and finger tack. These data are presented in Table 5.

TABLE 5

| Ex. | Processing Aid Identity | Processing Aid Level (Weight %) | 180° Peel (N/dm) | RT Shear (mins) | Finger Tack |
|---|---|---|---|---|---|
| 28 | Mineral Oil | 1 | 64.5 | 10,000 | 1 |
| 29 | Mineral Oil | 3 | 75.0 | 3,000 | 2 |
| 30 | IPM | 3 | 60.0 | 10,000 | 2 |
| 31 | IPM | 5 | 72.6 | 6,000 | 3 |
| C5 | None | 0 | 66.5 | 10,000 | 0 |

Example 32

In a reaction vessel was placed 11.11 parts of a blend of 75 weight % PDMS diamine 6,400 and 25 weight % PDMS diamine 33,000 and 30.00 parts of a 60% solution in toluene of SR-545 and 0.03 part of DYTEK A. Toluene (37.00 parts) and 2-propanol (21.00 parts) were added to make the solids content 30%. The solution was stirred at room temperature, 0.73 part of H-MDI was added and the resulting mixture was stirred for two hours to give a PSA solution with a weight ratio of elastomer to SR-545 (tackifier resin) of 40:60. A processing aid was added to this solution in the amount shown in Table 6. The resulting solution was solvent coated onto a release liner and dried for 10 minutes at 70° C. The resulting PSA coating was laminated onto a PET film to form a tape. The tape was tested for 180° peel force, elevated temperature shear strength and finger tack. These data are presented in Table 6.

TABLE 6

| Ex. | Processing Aid Identity | Processing Aid Level (Weight %) | 180° Peel (N/dm) | 70° C. Shear (mins) | Finger Tack |
|---|---|---|---|---|---|
| 32 | Santicizer (97) | 5 | 48.4 | 10,000 | 2 |

Examples 33–34 and Comparative Example C6

In a reaction vessel was placed 11.84 parts of PDMS diamine 33,000 and 30.00 parts of a 62.4% solution in xylene of MQ Resin 1 and 0.02 part of DYTEK A. Toluene (37.00 parts) and 2-propanol (21.00 parts) were added to make the solids content 30%. The solution was stirred at room temperature, 0.14 part of H-MDI was added and the resulting mixture was stirred for two hours to give a PSA solution with a weight ratio of elastomer to MQ Resin 1 (tackifier resin) of 40:60. A processing aid was added to this solution in the amounts shown in Table 7. The resulting solutions were solvent coated onto a release liner and dried for 10 minutes at 70° C. The resulting PSA coatings were laminated onto a PET film to form a tape. These tapes were tested for 180° peel force, elevated temperature shear strength and finger tack. These data are presented in Table 7.

TABLE 7

| Ex. | Processing Aid Identity | Processing Aid Level (Weight %) | 180° Peel (N/dm) | RT Shear (mins) | Finger Tack |
|---|---|---|---|---|---|
| 33 | IPM | 3 | 79.2 | 10,000 | 2 |
| 34 | IPM | 5 | 66.1 | 2100 | 3 |
| C6 | None | 0 | 5.7 | 10,000 | 0 |

Examples 35–36 and Comparative Example C7

In a reaction vessel was placed 11.77 parts of PDMS diamine 33,000 and 30.00 parts of a 62.4% solution in xylene of MQ Resin 1 and 0.04 part of DYTEK A. Toluene (37.00 parts) and 2-propanol (21.00 parts) were added to make the solids content 30%. The solution was stirred at room temperature, 0.19 part of H-MDI was added and the resulting mixture was stirred for two hours to give a PSA solution with a weight ratio of elastomer to MQ Resin 1 (tackifier resin) of 40:60. A processing aid was added to this solution in the amounts shown in Table 8. The resulting solution was solvent coated onto a release liner and dried for 10 minutes at 70° C. The resulting PSA coatings were laminated onto a PET film to form tapes. These tapes were tested for 180° peel force, elevated temperature shear strength and finger tack. These data are presented in Table 8.

TABLE 8

| Ex. | Processing Aid Identity | Processing Aid Level (Wt-%) | 180° Peel (N/dm) | RT Shear (mins) | Finger Tack | 70° C. Shear (mins) |
|---|---|---|---|---|---|---|
| 35 | IPM | 3 | 74.8 | 10,000 | 2 | 10,000 |
| 36 | IPM | 5 | 91.5 | 10,000 | 3 | 9,000 |
| C7 | None | 0 | 77.0 | 10,000 | 0 | 10,000 |

Examples 37–56 and Comparative Example C8–C10

In a reaction vessel fitted with a mechanical stirrer, reflux condenser and nitrogen atmosphere was placed 98 parts of PDMS diamine 33,000, 0.35 part of DYTEK A, 209.7 parts toluene and 89.9 parts 2-propanol. The reaction vessel was heated to 110° C. for 30 minutes, cooled to 80° C., degassed by sweeping the headspace of the reaction vessel with a stream of nitrogen gas until the vessel temperature reached 50° C. The reaction vessel was maintained at 50° C., 1.48 parts H-MDI was added to the vessel and the mixture was stirred for 2 hours. An additional 0.039 part of H-MDI was added to generate a 25% solids elastomer solution. A silicone polyurea PSA was prepared by combining and mixing 50.8 parts of this elastomer, 31.5 parts MQ Resin 1 at 62.4% solids in xylene, 77.4 parts toluene and 1.43 parts 2-propanol. To this PSA solution was added a variety of processing aids at a concentration of 1.5 parts processing aid per 100 parts silicone polyurea PSA solids, as shown in Table 9. The resulting PSA solutions were knife coated on release liner at a thickness appropriate to achieve a dry PSA coat thickness of approximately 0.05 mm after drying at 70° C. in a forced air oven for 10 minutes. The dry PSA film was laminated to PET and aged at ambient conditions for 2 days before performing tack and peel tests. A second sample of each tape was aged for 1 week at 70° C. and subsequently tested for elevated temperature shear as described above. Peel tests to HDPE were conducted as described above. Tack, peel and shear results are reported in Table 9.

TABLE 9

| Ex. | Processing Aid | Probe Tack (g) | 180° Peel from HDPE (N/dm) | 70° C. Shear (mins) |
|---|---|---|---|---|
| C8 | none | 6 | 0.9 | 10,000 |
| C9 | decane | 15 | 1.1 | 9,337 |
| C10 | dodecane | 5 | 0.9 | 9,323 |
| 37 | tetradecane | 114 | 4.2 | 9,365 |
| 38 | hexadecane | 436 | 79.2 | 8,611 |
| 39 | Exxsol D80 | 34 | 1.1 | 10,000 |
| 40 | Exxsol D110 | 126 | 15.7 | 10,000 |
| 41 | Exxsol D130 | 289 | 75.9 | 9,365 |

TABLE 9-continued

| Ex. | Processing Aid | Probe Tack (g) | 180° Peel from HDPE (N/dm) | 70° C. Shear (mins) |
|---|---|---|---|---|
| 42 | octadecene | 336 | 82.7 | 10,000 |
| 43 | tributyrin | 123 | 73.5 | 8,414 |
| 44 | tricaprylin | 133 | 49 | 2,593 |
| 45 | Citroflex A-4 | 106 | 63 | 3,869 |
| 46 | Citroflex B-6 | 126 | 78.3 | 5,436 |
| 47 | Tellura 315A | 159 | 71.5 | 7,070 |
| 48 | Tellura 415A | 223 | 77.2 | 10,000 |
| 49 | Britol | 210 | 94.9 | 6,403 |
| 50 | DC 200 | 51 | 2.2 | 8,280 |
| 51 | D10HEX | 54 | Not Tested | Not Tested |
| 52 | D10DEC | 45 | Not Tested | Not Tested |
| 53 | D30HEX | 43 | Not Tested | Not Tested |
| 54 | D2DEC | 328 | 68 | 3,887 |
| 55 | D2TET | 297 | 93.2* | 1,992 |
| 56 | Silicate Cluster 102 | 82 | 0.7 | 6,894 |

*cohesive split of PSA

Examples 57–59 and Comparative Example C11

In a reaction vessel fitted with a mechanical stirrer, reflux condenser and nitrogen atmosphere was placed 98 parts of PDMS diamine 33,000, 0.35 part of DYTEK A, 209.7 parts toluene and 89.9 parts 2-propanol. The reaction vessel was heated to 110° C. for 30 minutes, cooled to 80° C., degassed by sweeping the headspace of the reaction vessel with a stream of nitrogen gas until the vessel temperature reached 50° C. The reaction vessel was maintained at 50° C., 1.48 parts H-MDI was added to the vessel and the mixture was stirred for 2 hours. An additional 0.039 part of H-MDI was added to generate a 25% solids elastomer solution. A silicone polyurea PSA was prepared by combining and mixing 50.8 parts of this elastomer, 31.5 parts MQ Resin 1 at 62.4% solids in xylene, 77.4 parts toluene and 1.43 parts 2-propanol. To this PSA solution was added a variety of processing aids at a concentration of 1.5 parts processing aid per 100 parts silicone polyurea PSA solids, as shown in Table 10. The resulting PSA solutions were knife coated on release liner at a thickness appropriate to achieve a dry PSA coat thickness of approximately 0.05 mm after drying at 70° C. in a forced air oven for 10 minutes. The dry PSA film was laminated to PET and aged at ambient conditions for 2 days before performing tack and peel tests. A second sample of each tape was aged for 1 week at 70° C. and subsequently tested for tack and peel. Peel tests to HDPE were conducted as described above. Tack and peel results are reported in Table 10.

TABLE 10

| Ex. | Processing Aid | Initial Probe Tack (g) | Initial 180° Peel from HDPE (N/dm) | Probe Tack after Aging 7 days at 70° C. (g) | 180° Peel from HDPE after aging 7 days at 70° C. (N/dm) |
|---|---|---|---|---|---|
| C11 | None | 9 | 1.8 | 105 | 9.2 |
| 57 | TINUVIN 328 | 299 | 65.6 | 419 | 65.0 |
| 58 | TINUVIN 292 | 200 | 75.9 | 420 | 63.5 |
| 59 | IRGANOX 1076 | 267 | 80.3 | 530 | 67.8 |

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A pressure sensitive adhesive comprising:
a silicone tackifying resin;
a polydiorganosiloxane polyurea copolymer that is the reaction product of a polydiorganosiloxane polyamine with polyisocyanate, wherein the mole ratio of isocyanate to amine is in a range of about 0.97:1 to about 1.03:1; and
a plasticizer;
wherein the silicone tackifying resin and polydiorganosiloxane polyurea copolymer are generally uniformly distributed; the pressure sensitive adhesive is organic solvent-based; the silicone tackifying resin is present in an amount of at least about 55 wt-%, based on the weight of the silicon tackifying resin and the polydiorganosiloxane polyurea copolymer; and the plasticizer is present in an amount sufficient to provide a generally uniform distribution of the polydiorganosiloxane polyurea copolymer and the silicone tackifying resin.

2. The pressure sensitive adhesive of claim 1 wherein the silicone tackifying resin is present in an amount of at least about 58 wt-%, based on the weight of the silicone tackifying resin and the polydiorganosiloxane polyurea copolymer.

3. The pressure sensitive adhesive of claim 1 wherein the plasticizer is a hydrocarbon.

4. The pressure sensitive adhesive of claim 1 wherein the plasticizer is a glycol ether, an ester, an alcohol, an ester alcohol, a ketone, an amine, or an organic substituted silicone oil.

5. The pressure sensitive adhesive of claim 1 wherein the plasticizer is a ester, an oil, an organosiloxane, or combinations thereof.

6. The pressure sensitive adhesive of claim 1 wherein the plasticizer is an antioxidant, a bacteriostatic agent, a UV light stabilizer, a UV light absorber, or combinations thereof.

7. The pressure sensitive adhesive of claim 1 wherein the plasticizer is present in an amount of at least about 0.5 wt-%, based on the total weight of the pressure sensitive adhesive.

8. The pressure sensitive adhesive of claim 7 wherein the polydiorganosiloxane polyurea copolymer is the reaction product of a polydiorganosiloxane polyamine with a polyisocyanate and a polyfunctional chain extender.

9. The pressure sensitive adhesive of claim 8 wherein the polyamine is a polydiorganosiloxane diamine.

10. The pressure sensitive adhesive of claim 1 wherein the polydiorganosiloxane polyurea copolymer comprises the following repeating unit:

where:
each R is independently an alkyl moiety, a vinyl moiety or higher alkenyl moiety, a cycloalkyl moiety, an aryl moiety, or a fluorine-containing group;
each Z is independently a polyvalent moiety that is an arylene moiety, an aralkylene moiety, an alkylene moiety, or a cycloalkylene moiety;
each Y is independently a polyvalent moiety that independently is an alkylene moiety, an aralkylene moiety or an arylene moiety;
each E is independently hydrogen, an alkyl moiety of 1 to 10 carbon atoms, phenyl, or a moiety that completes a ring structure including Y to form a heterocycle;
each A is independently oxygen or —N(G)-, wherein each G is independently hydrogen, an alkyl moiety of 1 to 10 carbon atoms, phenyl, or a moiety that completes a ring structure including B to form a heterocycle;
B is an alkylene, aralkylene, cycloalkylene, phenylene, polyalkylene, polyalkylene oxide, copolymers, or mixtures thereof, or a moiety completing a ring structure including A to form a heterocycle;
m is a number that is 0 to about 1000;
n is a number that is equal to or greater than 1; and
p is a number that is about 5 or larger.

11. The pressure sensitive adhesive of claim 10 wherein at least 50% of the R moieties are methyl moieties with the balance being monovalent alkyl or substituted alkyl moieties having 1 to 12 carbon atoms, alkenylene moieties, phenyl moieties, or substituted phenyl moieties.

12. The pressure sensitive adhesive of claim 10 wherein m is a number that is 0 to about 25.

13. The pressure sensitive adhesive of claim 10 wherein n is a number that is greater than 8.

14. The pressure sensitive adhesive of claim 10 wherein p is a number that is about 70 to about 1500.

15. A pressure sensitive adhesive comprising:
a silicone tackifying resin;
a polydiorganosiloxane polyurea copolymer that is reaction product of a polydiorganosiloxane polyamine with a polyisocyanate, wherein the mole ratio of socialite to amine is in range of about 0.97:1 to about 1.03:1; and
a plasticizer;
wherein the silicone tackifying resin and polydiorganosiloxane polyurea copolymer are generally uniformly distributed; and
wherein the silicone tackifying resin is present in an amount of at least about 55 wt-%, based on the weight of the silicone tackifying resin and the polydiorganosiloxane polyurea copolymer, and the processing aid is present in an amount sufficient to provide a general uniform distribution of the polydiorganosiloxane polyurea copolymer and the silicone tackifying resin.

16. A pressure sensitive adhesive solution comprising:
a silicone tackifying resin;
a polydiorganosiloxane polyurea copolymer that is the reaction product of a polydiorganosiloxane polyamine

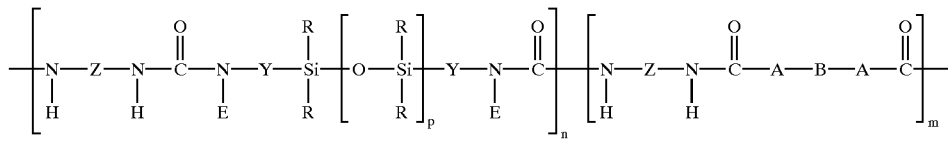

with a polyisocyanate, wherein the mole ratio of isocyanate to amine is in a range of about 0.97:1 to about 1.03:1;
a processing aid;
an organic solvent; and
wherein the silicone tackifying resin is present in an amount of at least about 55 wt-%, based on the weight of the silicone tackifying resin and the polydiorganosiloxane polyurea copolymer, and the processing aid is present in an amount sufficient to provide a generally uniform distribution of the polydiorganosiloxane polyurea copolymer and the silicone tackifying resin.

17. The pressure sensitive adhesive solution of claim 16 wherein the processing aid is transient.

18. The pressure sensitive adhesive solution of claim 16 wherein the processing aid is permanent.

19. The pressure sensitive adhesive solution of claim 16 wherein the silicone tackifying resin is present in an amount of at least about 58 wt-%, based on the weight of the silicone tackifying resin and the polydiorganosiloxane polyurea copolymer.

20. The pressure sensitive adhesive solution of claim 16 wherein the processing aid is a hydrocarbon.

21. The pressure sensitive adhesive solution of claim 16 wherein the processing aid is a glycol ether, an ester, an alcohol, an ester alcohol, a ketone, an amine, or an organic substituted silicone oil.

22. The pressure sensitive adhesive solution of claim 16 wherein the processing aid is an ester, an oil, an organosiloxane, or combinations thereof.

23. The pressure sensitive adhesive solution of claim 16 wherein the processing aid is an antioxidant, a bacteriostatic agent, a UV light stabilizer, a UV light absorber, or combinations thereof.

24. The pressure sensitive adhesive solution of claim 16 wherein the processing aid is present in an amount of at least about 0.5 wt-%, based on the total weight of the pressure sensitive adhesive.

25. The pressure sensitive adhesive solution of claim 16 wherein the polydiorganosiloxane polyurea copolymer comprises the following repeating unit:

B is an alkylene, aralkylene, cycloalkylene, phenylene, polyalkylene, polyalkylene oxide, copolymers, or mixtures thereof, or a moiety completing a ring structure including A to form a heterocycle;
m is a number that is 0 to about 1000;
n is a number that is equal to or greater than 1; and
p is a number that is about 5 or larger.

26. An adhesive article comprising a backing and the pressure sensitive adhesive of claim 1 disposed on at least one major surface thereof.

27. The adhesive article of claim 26 which is a transfer tape.

28. An adhesive article comprising a backing and the pressure sensitive adhesive of claim 15 disposed on at least one major surface thereof.

29. The adhesive article of claim 28 which is a transfer tape.

30. An adhesive article comprising a backing and a pressure sensitive adhesive deposited from the solution of claim 16 disposed on at least one major surface thereof.

31. The adhesive article of claim 30 which is a transfer tape.

32. A method of making a pressure sensitive adhesive comprising combining a silicone tackifying resin, a polydiorganosiloxane polyurea copolymer that is the reaction product of a polydiorganosiloxane polyamine with a polyisocyanate and has a mole ratio of isocyanate to amine in the range of about 0.97:1 to about 1.03:1, and a processing aid in amounts effective to form a pressure sensitive adhesive wherein the silicone tackifying resin and polydiorganosiloxane polyurea copolymer are generally uniformly distributed, wherein the silicone tackifying resin, polydiorganosiloxane polyurea copolymer, and processing aid are combined in an organic solvent; and wherein the silicone tackifying resin is present in an amount of at least about 55 wt-%, based on the weight of the silicone tackifying resin and the polydiorganosiloxane polyurea copolymer, and the processing aid is present in an amount sufficient to provide a generally uniform distribution of the polydiorganosiloxane polyurea copolymer and the silicone tackifying resin.

33. The method of claim 32 wherein the processing aid is transient.

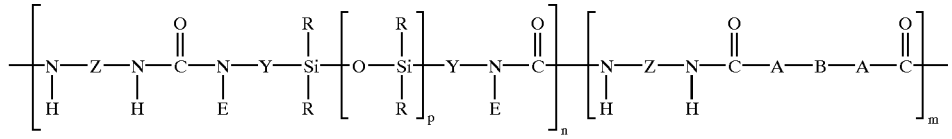

where:
each R is independently an alkyl moiety, a vinyl moiety or higher alkenyl moiety, a cycloalkyl moiety, an aryl moiety, or a fluorine-containing group;
each Z is independently a polyvalent moiety that is an arylene moiety, an aralkylene moiety, an alkylene moiety, or a cycloalkylene moiety;
each Y is independently a polyvalent moiety that independently is an alkylene moiety, an aralkylene moiety or an arylene moiety;
each E is independently hydrogen, an alkyl moiety of 1 to 10 carbon atoms, phenyl, or a moiety that completes a ring structure including Y to form a heterocycle;
each A is independently oxygen or —N(G)-, wherein each G is independently hydrogen, an alkyl moiety of 1 to 10 carbon atoms, phenyl, or a moiety that completes a ring structure including B to form a heterocycle;

34. The method of claim 32 wherein the processing aid is permanent.

35. The method of claim 32 wherein the processing aid is an antioxidant, a bacteriostatic agent, a UV light stabilizer, a UV light absorber, or combinations thereof.

36. The pressure sensitive adhesive of claim 1 wherein the processing is selected to provide the pressure sensitive adhesive with an improvement in tack of a least 10% relative to an identical composition but not containing the processing plasticizer.

37. The pressure sensitive adhesive of claim 15 wherein the plasticizer is selected to provide the pressure sensitive adhesive with an improvement in tack of a least 10% relative to an identical composition but not containing the processing plasticizer.

38. The pressure sensitive adhesive of claim 16 wherein the processing aid is selected to provide the pressure sensitive adhesive with an improvement in tack of a least 10% relative to an identical composition but not containing the processing aid.

39. The pressure sensitive adhesive of claim 32 wherein the processing aid is selected to provide the pressure sensitive adhesive with an improvement in tack of a least 10% relative to an identical composition but not containing the processing aid.

* * * * *

UNITED STATES PATENT AND TRADEMARK OFFICE
CERTIFICATE OF CORRECTION

PATENT NO.        : 7,012,110 B2
APPLICATION NO. : 10/028553
DATED               : March 14, 2006
INVENTOR(S)     : Audrey A. Sherman It is certified that error appears in the above-identified patent and that said Letters Patent is hereby corrected as shown below:

Column First Page Col. 2 (Other Publications) – Line 11 - Delete "Machine"," and insert -- Machine," --, therefor.

Column 3 – Line 43 - Delete "(e.g," and insert -- (e.g., --, therefor.

Column 6 – Line 31 - Delete "Nos." and insert -- No. --, therefor.

Column 11 – Line 55 - Delete "theologically" and insert -- rheologically --, therefor.

Column 21 – Line 17 (Approx.) - In Claim 1, after "with" insert -- a --.

Column 21 – Line 26 - In Claim 1, delete "silicon" and insert -- silicone --, therefor.

Column 21 – Line 42 - In Claim 5, delete "a" and insert -- an --, therefor.

Column 22 – Line 39 - In Claim 15, after "that is" insert -- the --.

Column 22 – Line 41 - In Claim 15, delete "socialite" and insert -- isocyanate --, therefor.

Column 22 – Line 42- In Claim 15, after "is in" insert -- a --.

Column 22 – Line 51 - In Claim 15, delete "general" and insert -- generally --, therefor.

Column 24 – Line 58 (Approx.) - In Claim 36, delete "processing" and insert -- plasticizer --, therefor.

Column 24 – Line 60 (Approx.) - In Claim 36, after "the" delete "processing".

Column 24 – Line 64 - In Claim 37, after "the" delete "processing".

UNITED STATES PATENT AND TRADEMARK OFFICE
CERTIFICATE OF CORRECTION

PATENT NO.       : 7,012,110 B2
APPLICATION NO.  : 10/028553
DATED            : March 14, 2006
INVENTOR(S)      : Audrey A. Sherman It is certified that error appears in the above-identified patent and that said Letters Patent is hereby corrected as shown below:

Column 25 – Line 4 - In Claim 39, delete "pressure sensitive adhesive" and insert -- method --, therefor.

Signed and Sealed this

Fifteenth Day of May, 2007

JON W. DUDAS
*Director of the United States Patent and Trademark Office*